(12) United States Patent
Kirch et al.

(10) Patent No.: US 8,369,893 B2
(45) Date of Patent: Feb. 5, 2013

(54) METHOD AND SYSTEM FOR ADAPTING MOBILE DEVICE TO ACCOMMODATE EXTERNAL DISPLAY

(75) Inventors: Jorge Kirch, Schaumburg, IL (US);
Binu Abraham, Round Lake, IL (US);
Joshua Galicia, Cary, IL (US)

(73) Assignee: Motorola Mobility LLC, Libertyville, IL (US)

( * ) Notice: Subject to any disclaimer, the term of this patent is extended or adjusted under 35 U.S.C. 154(b) by 98 days.

(21) Appl. No.: 12/983,161

(22) Filed: Dec. 31, 2010

(65) Prior Publication Data
US 2012/0172088 A1    Jul. 5, 2012

(51) Int. Cl.
*H04W 88/02*    (2009.01)
(52) U.S. Cl. ........................... 455/557; 340/5.82
(58) Field of Classification Search .......... 455/557, 455/566, 422.1, 456.1; 345/170; 715/733
See application file for complete search history.

(56) References Cited

U.S. PATENT DOCUMENTS

| | | | |
|---|---|---|---|
| 7,199,787 B2 | 4/2007 | Lee et al. | |
| 2002/0085037 A1 | 7/2002 | Leavitt et al. | |
| 2012/0050331 A1* | 3/2012 | Kanda | 345/649 |
| 2012/0088549 A1* | 4/2012 | Yun et al. | 455/557 |

FOREIGN PATENT DOCUMENTS
WO    2009143294 A2    11/2009

OTHER PUBLICATIONS

Patent Cooperation Treaty, "PCT Search Report and Written Opinion of the International Searching Authority" for International Application No. PCT/US2011/067468 dated May 30, 2012, 9 pages.

* cited by examiner

*Primary Examiner* — Phuoc Doan

(57) ABSTRACT

In at least one embodiment, a mobile device system includes an external display device in communication with a mobile device. The mobile device has a touchscreen display, an operating system and at least one additional software component executed by processing component(s), where one or more input signals from the display are communicated to the operating system. The at least one additional software component generates output signals based upon one or more image signals communicated at least indirectly from the operating system. The external display device receives the output signals and based thereon displays an image having two components, one of which is reflective of a mobile device status/operational condition and is substantially similar to another image that would have been displayed on the touchscreen display if the external display device and mobile device were not in communication. Methods of operating such mobile device systems, and mobile devices, are also disclosed.

18 Claims, 6 Drawing Sheets

METHOD AND SYSTEM FOR ADAPTING MOBILE DEVICE TO ACCOMMODATE EXTERNAL DISPLAY

CROSS-REFERENCE TO RELATED APPLICATIONS

STATEMENT REGARDING FEDERALLY SPONSORED RESEARCH OR DEVELOPMENT

FIELD OF THE INVENTION

The present invention relates to mobile devices and, more particularly, to methods and systems allowing for outputting information or signals from, and/or inputting information or signals to, mobile devices.

BACKGROUND OF THE INVENTION

Mobile devices such as cell phones, personal digital assistants (PDAs), and smart phones are ubiquitous and used for a variety of purposes. Although mobile devices provide many advantages to users, the usage of mobile devices in some circumstances is constrained or less than ideal because of the mobile devices' relatively small size.

Among other things, the displays or screens incorporated on mobile devices typically are of relatively small cross-section. Thus, depending upon the circumstance, such displays are often inadequate for clearly displaying large amounts of information. Also, the dedicated keys or buttons on mobile devices often are relatively small in their physical size and as a result in some circumstances it can be awkward for users to push or otherwise manipulate these input devices to input commands or information into the mobile devices.

It would therefore be advantageous if an improved method or system, for use or implementation on or in relation to mobile devices, could be developed that allowed for mobile devices to overcome one or more shortcomings such as one or more of those mentioned above.

SUMMARY OF THE INVENTION

In at least one embodiment, the present invention relates to a mobile device. The mobile device includes a first communication device having one or both of a first transmitter and a first receiver, a user input device allowing the mobile device to receive user inputs, a terminal by which the mobile device can be in communication with an external display device, and at least one processor portion executing a plurality of software components including a mobile device operating system component and at least one intermediary software component by which the mobile device operating system communicates at least indirectly with both the user input device and the terminal. The plurality of software components operate so as to provide external display driving signals at the terminal that are configured to cause the external display device to display an image including a first image portion representative of an operational status or condition of the mobile device.

In at least one additional embodiment, the present invention relates to a mobile device system that includes a mobile device and an external display device. The mobile device has a touchscreen display, an operating system and at least one additional software component executed by at least one processing component, the at least one additional software component serving to communicate to the operating system, at least indirectly, one or more input signals from the touchscreen display. The at least one additional software component generates output signals based upon one or more first image signals communicated at least indirectly from the operating system. The external display device of the mobile device system is in communication with the mobile device. The external display device receives the output signals and based thereon displays an image having first and second image components, and the first image component is reflective of a mobile device status or operational condition and is substantially similar to another image that would have been displayed on the touchscreen display if the external display device was not in communication with the mobile device.

Further, in at least one embodiment, the present invention relates to a method of operating a mobile device in relation to an external display device. The method includes receiving one or more user inputs at a touchscreen display of the mobile device and providing, at least indirectly, one or more input signals indicative of the user inputs to a mobile device operating system by way of one or more additional intermediary software components. The method additionally includes generating at the mobile device operating system one or more first image signals indicative of a first image portion representative of a mobile device status or operational condition, and processing the one or more first image signals so as to produce second image signals also indicative of the first image portion. The method further includes sending output signals identical to or based at least partly upon the second image signals for receipt by the external display device, whereby the external display device displays an overall image including the first image portion.

DETAILED DESCRIPTION

Figure 1:
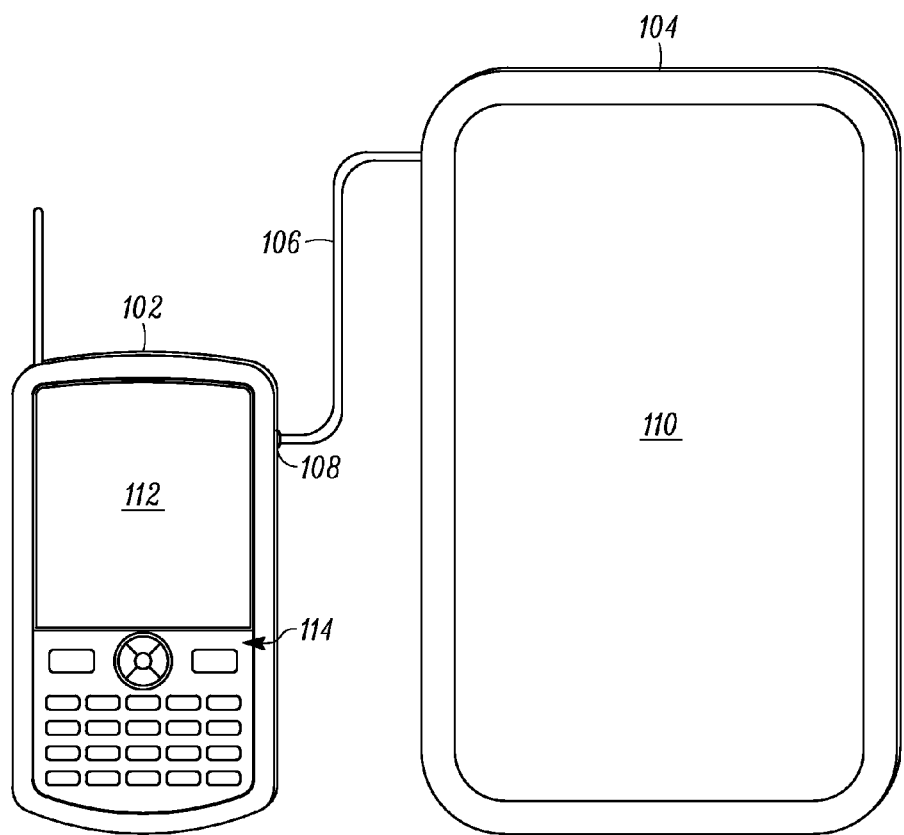
FIG. 1 shows an exemplary system including a mobile device coupled to, and in communication with, an external display device in accordance with one embodiment of the present invention.

Referring to FIG. 1, an example mobile device 102 is shown to be interconnected with an external display device 104. The interconnection in the present embodiment is a wired connection 106 linking a terminal (output terminal) 108 of the mobile device 102 with the external display device 104. In alternate embodiments, other forms of connections between the mobile device 102 and the external display device 104 can be implemented, including wireless connections such as a Bluetooth connection. The mobile device 102 is intended to be representative of a variety of mobile devices including, for example, cellular telephones, personal digital assistants (PDAs), smart phones, or other handheld or portable electronic devices. In alternate embodiments, the mobile device can also be a headset, MP3 player, battery-powered device, wearable device, radio, navigation device, laptop or notebook computer, netbook, pager, PMP (personal media player), DVR (digital video recorders), gaming device, camera, e-reader, e-book, tablet device, navigation device with video capable screen, multimedia docking station, or other mobile device.

The external display device 104 can also take a variety of forms depending on the embodiment. For example, the external display device 104 can be a television, a high-definition television (HDTV) display, a monitor, or other display device (e.g., a tablet device such as an e-book), including possibly a display device that is already associated with or implemented in other device. In the present embodiment, it is envisioned that the external display device 104 does not have significant processing capabilities and merely serves as a device for displaying images purely or substantially based upon signals generated by and received from the mobile device 102 and communicated to the external display device 104 via the wired connection 106. To the extent the external display device 104 has any processing capabilities, such capabilities are limited to adjusting standard image characteristics such as tint, brightness, contrast and black and white versus color display, etc. However, in other embodiments, the external display device can instead be a "smart" device having more processing capabilities. For example, the external display device can be a screen of a personal computer, notebook computer or similar device having substantial processing capabilities.

As shown, in the present embodiment the external display device 104 particularly includes a display 110 that is substantially larger in cross-sectional area than a touchscreen display 112 of the mobile device 102 (e.g., an area that is approximately 10 times larger). Nevertheless, the relative sizes of the displays 110, 112 can vary considerably depending upon the embodiment. In addition to being able to output images, the touchscreen display 112 is also able to receive or sense touch type inputs as provided by way of a user's finger or other touch input device such as a stylus. Notwithstanding the presence of the touchscreen display 112, in the present embodiment the mobile device 102 also has a number of discrete keys or buttons 114 that serve as input devices of the mobile device. However, in other embodiments such keys or buttons (or any particular number of such keys or buttons) need not be present, and rather the touchscreen display 112 can serve as the primary or only user input device.

Figure 2:
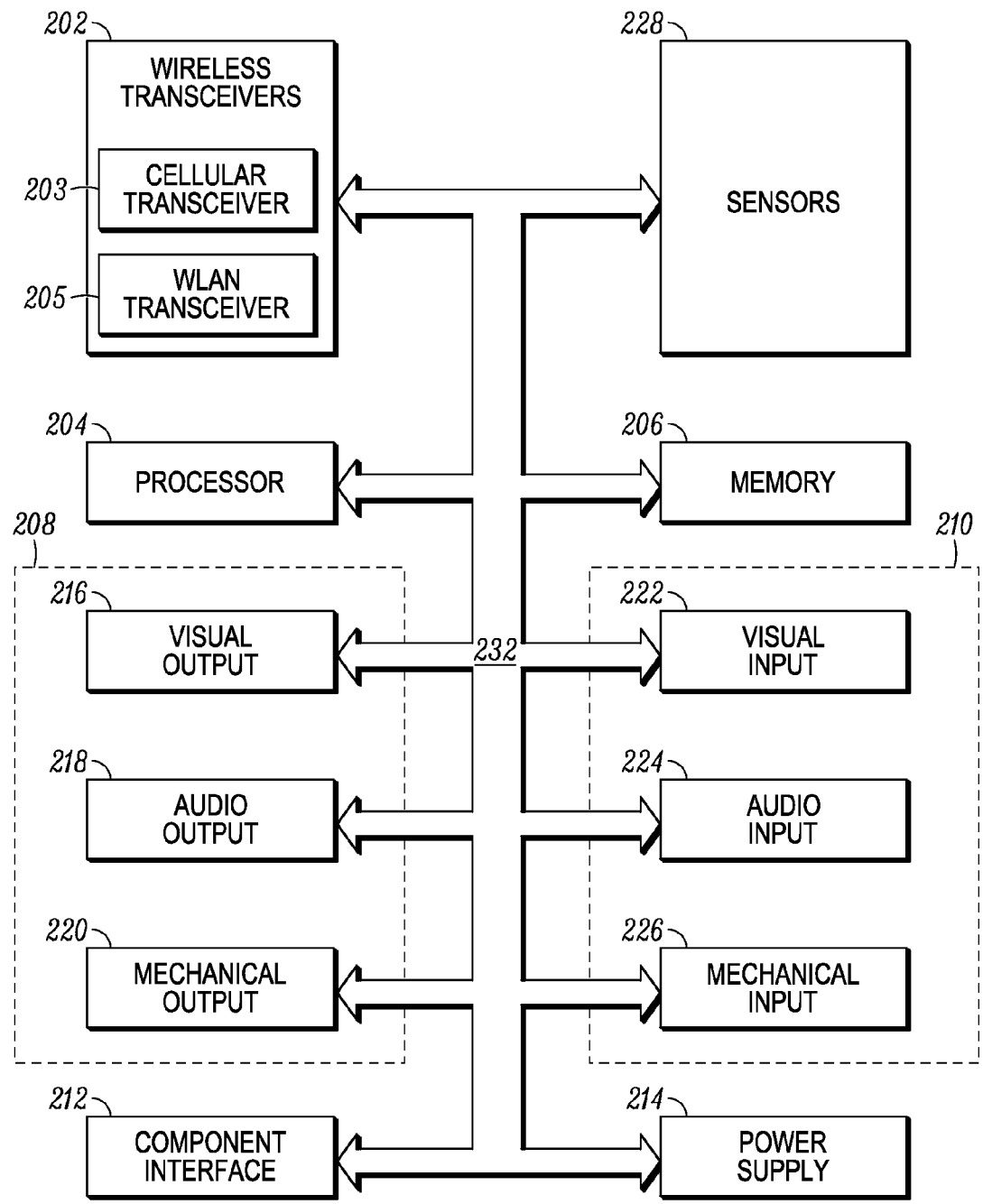
FIG. 2 is a block diagram showing example internal hardware components of the mobile device of FIG. 1.

Referring to FIG. 2, there is provided a block diagram illustrating example internal hardware components 200 of the mobile device 102 of FIG. 1, in accordance with the present embodiment. As shown in FIG. 2, the internal components 200 include one or more wireless transceivers 202, a processor portion 204 (e.g., one or more of microprocessor(s), microcomputer(s), application-specific integrated circuit(s), etc.), a memory portion 206, one or more output devices 208, and one or more input devices 210. The internal components 200 can further include a component interface 212 to provide a direct connection to auxiliary components or accessories for additional or enhanced functionality. The internal components 200 preferably also include a power supply 214, such as a battery, for providing power to the other internal components while enabling the mobile device 102 to be portable. Further, the internal components 200 additionally include one or more sensors 228. All of the internal components 200 can be coupled to one another, and in communication with one another, by way of one or more internal communication links 232 (e.g., an internal bus).

Each of the wireless transceivers 202 utilizes a wireless technology for communication, which can include for example (but are not limited to) cellular-based communication technologies such as analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF (radio frequency), Bluetooth or IEEE 802.11 (a, b, g or n), or other wireless communication technologies such as infrared technology. In the present embodiment, the wireless transceivers 202 include a cellular transceiver 203 and a wireless local area network (WLAN) transceiver 205, although in other embodiments only one of these types of wireless transceivers (and possibly neither of these types of wireless transceivers, and/or additional types of wireless transceivers) is present. It should be understood that, while the present embodiment includes the wireless transceivers 202, each of which can be understood to include both a wireless receiver and a wireless transmitter, in other embodiments the receiver and transmitter for any given type of type of wireless technology can be distinct components, and/or a receiver for a given type of wireless technology can be present even though a transmitter for that wireless technology is not present, or vice-versa (a transmitter is present while a receiver is not).

By virtue of the use of the wireless transceivers 202, the mobile device 102 is capable of communicating with a variety of external components such as cell towers, access points/hotspots, and other devices. As already noted, although the embodiment of FIG. 1 shows the external display device 104 as being coupled to the mobile device 102 via the wired connection 106, in other embodiments communications between the mobile device and the external display device can be accomplished by way of a wireless connection. In some such embodiments, one or more of the wireless transceivers 202 (for example, a Bluetooth transceiver) can be used by the mobile device 102 to achieve communications with the external display device 104. To the extent that such wireless communications are used for this purpose, the wireless transceivers 202 (or the particular wireless transceiver of the mobile device used for such communications) can be considered the terminal 108 of the mobile device by which the mobile device is in communications with the external display device.

Operation of the wireless transceivers 202 in conjunction with others of the internal components 200 of the mobile device 102 can take a variety of forms. For example, operation of the wireless transceivers 202 can proceed in a manner in which, upon reception of wireless signals, the internal components 200 detect communication signals and the transceivers 202 demodulate the communication signals to recover incoming information, such as voice and/or data, transmitted by the wireless signals. After receiving the incoming information from the transceivers 202, the processor portion 204 formats the incoming information for the one or more output devices 208. Likewise, for transmission of wireless signals, the processor portion 204 formats outgoing information, which can but need not be activated by the input devices 210, and conveys the outgoing information to one or more of the wireless transceivers 202 for modulation so as to provide modulated communication signals to be transmitted. The wireless transceivers 202 convey the modulated communication signals by way of wireless (as well as possibly wired)

communication links (not shown) to other devices such as cell towers, access point/hotspots, or remote server or a variety of other remote devices.

Depending upon the embodiment, the input and output devices 208, 210 of the internal components 200 can include a variety of visual, audio and/or mechanical outputs. For example, the output device(s) 208 can include one or more visual output devices 216 such as a liquid crystal display and/or light emitting diode indicator, one or more audio output devices 218 such as a speaker, alarm, and/or buzzer, and/or one or more mechanical output devices 220 such as a vibrating mechanism. The visual output devices 216 among other things can also include a video screen. Likewise, by example, the input device(s) 210 can include one or more visual input devices 222 such as an optical sensor (for example, a camera lens and photosensor), one or more audio input devices 224 such as a microphone, and/or one or more mechanical input devices 226 such as a flip sensor, keyboard, keypad, selection button, navigation cluster, touch pad, capacitive sensor, motion sensor, and/or switch. Operations that can actuate one or more of the input devices 210 can include not only the physical pressing/actuation of buttons or other actuators, but can also include, for example, opening the mobile device, unlocking the device, moving the device to actuate a motion, moving the device to actuate a location positioning system, and operating the device.

Additionally, while in FIG. 2 the input devices 210 are shown to be distinct from the output devices 208, it should be recognized that in some embodiments including the present embodiment one or more devices serve both as input device(s) and output device(s). That is, in the present embodiment of FIG. 1, the touchscreen display 112 of the mobile device 102 is a user interface that comprises both one or more of the visual output devices 216, insofar as the touchscreen display outputs images, as well as one or more of the mechanical input devices 226, insofar as user touch inputs are sensed by the touchscreen display. In other embodiments, other types of device scan be used that should be considered both among the input devices 210 and the output devices 208.

As mentioned above, the internal components 200 also can include one or more of various types of sensors 228. The sensors 228 can include, for example, proximity sensors (e.g., a light detecting sensor, an ultrasound transceiver or an infrared transceiver), touch sensors, altitude sensors, and one or more location circuits/components that can include, for example, a Global Positioning System (GPS) receiver, a triangulation receiver, an accelerometer, a tilt sensor, a gyroscope, or any other information collecting device that can identify a current location or user-device interface of the mobile device 102. While the sensors 228 for the purposes of FIG. 2 are considered to be distinct from the input devices 210, in other embodiments it is possible that one or more of the input devices can also be considered to constitute one or more of the sensors (and vice-versa). For purposes of the present description, the touchscreen display 112 is considered to not be (and to not include) any of the sensors 228, although the touch sensing capability of that display could alternately be considered as being among the sensors.

The memory portion 206 of the internal components 200 can encompass one or more memory devices of any of a variety of forms (e.g., read-only memory, random access memory, static random access memory, dynamic random access memory, etc.), and can be used by the processor portion 204 to store and retrieve data. In some embodiments, the memory portion 206 (or a portion thereof) can be integrated with the processor portion 204 (or a portion thereof) in a single device (e.g., a processing device including memory or processor-in-memory (PIM)), albeit such a single device will still typically have distinct portions/sections that perform the different processing and memory functions and that can be considered separate devices. The data that is stored by the memory portion 206 can include, but need not be limited to, operating systems, programs (applications), and informational data. Each operating system includes executable code that controls basic functions of the mobile device 102, such as interaction among the various components included among the internal components 200, communication with external devices via the wireless transceivers 202 and/or the component interface 212, and storage and retrieval of programs and data, to and from the memory portion 206. One example operating system is discussed in further detail below with respect to FIGS. 3-6.

As for programs, each program includes executable code that utilizes an operating system to provide more specific functionality, such as file system service and handling of protected and unprotected data stored in the memory portion 206. Although many such programs govern standard or required functionality of the mobile device 102, in many cases the programs include applications (or simply "apps") governing optional or specialized functionality, which can be provided in some cases by third party vendors unrelated to the mobile device manufacturer. The operation of certain example programs/applications of the mobile device 102 of the present embodiment are discussed in further detail with reference to FIGS. 3-6, particularly in terms of how those programs/applications interact with the mobile device operating system and certain hardware components of the mobile device 102 and the external display device 104.

Finally, with respect to informational data, this is non-executable code or information that can be referenced and/or manipulated by an operating system or program for performing functions of the mobile device 102. Such informational data can include, for example, data that is preprogrammed upon the mobile device 102 during manufacture, or any of a variety of types of information that is uploaded to, downloaded from, or otherwise accessed at servers or other devices with which the mobile device 102 is in communication during its ongoing operation.

Figure 3:
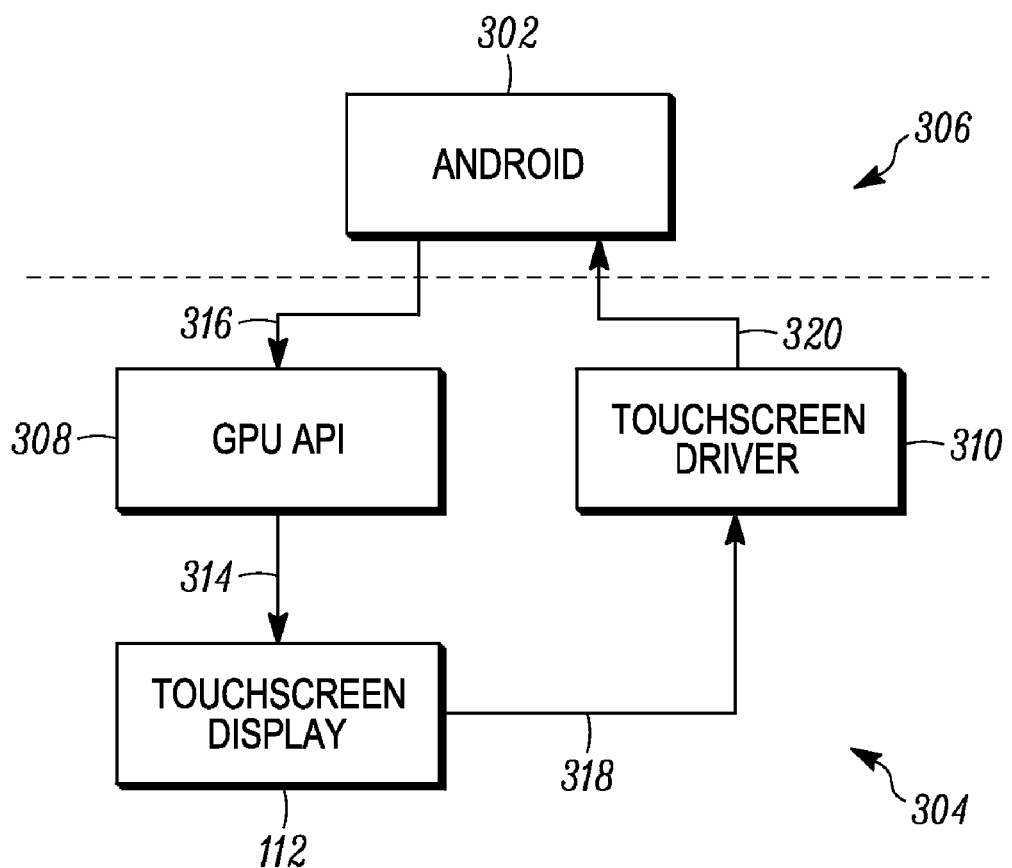
FIG. 3 is a block diagram showing example software components that operate on the mobile device and mobile device internal hardware components of FIGS. 1 and 2, particularly in a normal mode of operation when the mobile device is not coupled to the external display device.
Figure 4:
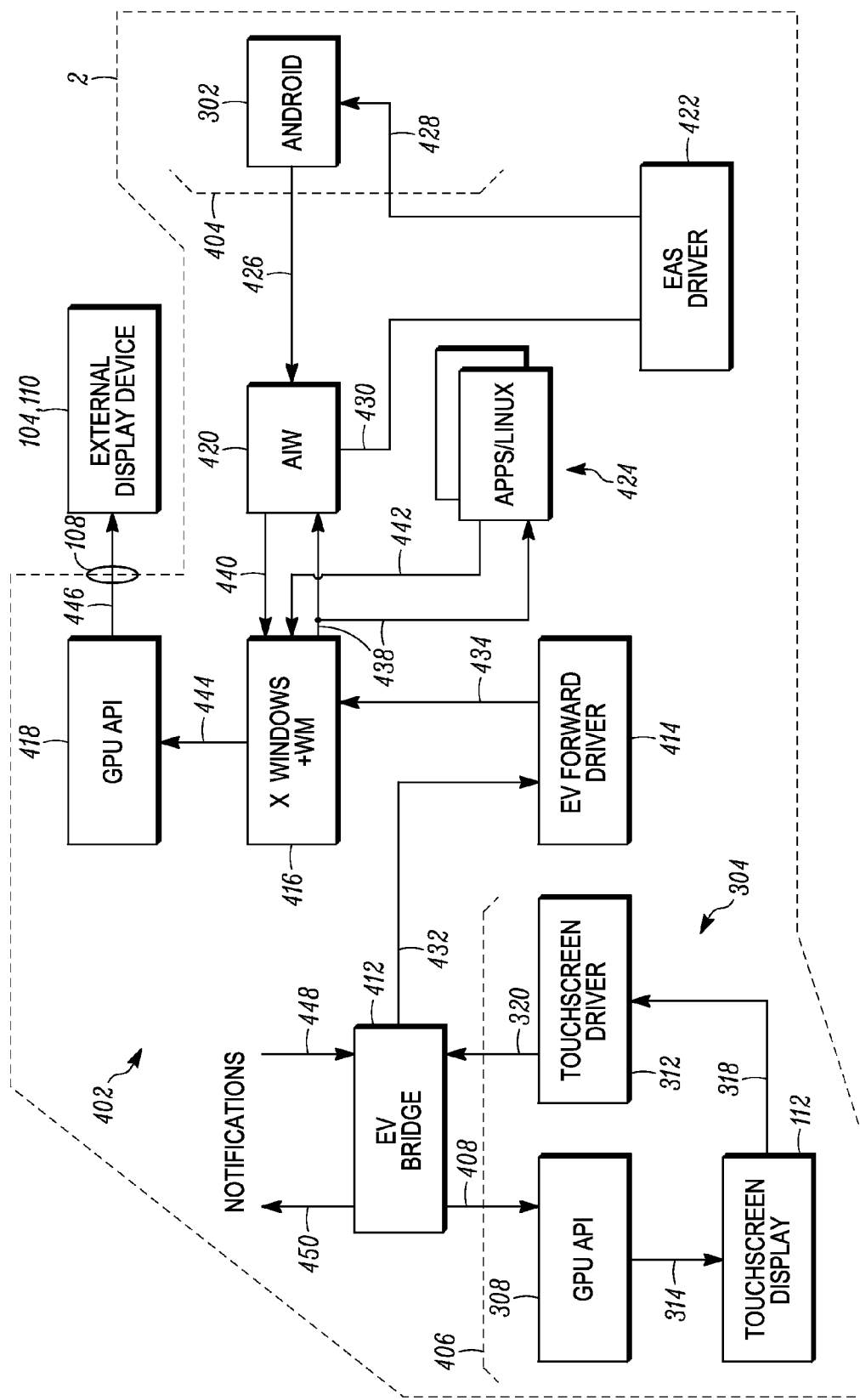
FIG. 4 is a block diagram showing example software components that operate on the mobile device and mobile device internal hardware components of FIGS. 1 and 2, particularly in an external display mode of operation when the mobile device is coupled to the external display device.

Turning to FIGS. 3 and 4, while FIG. 2 demonstrates various hardware components of the mobile device 102, FIGS. 3 and 4 schematically illustrate various software components being executed by the mobile device and in particular the mobile device processor portion 204. FIG. 3 particularly shows how the mobile device software components interact with one another when the external display device 104 is disconnected from the mobile device 102, while FIG. 4 shows how the mobile device software components interact with one another when the external display device is connected with (or when the external display device is in communication with) the mobile device. The switch between operation according to FIG. 3 and operation according to FIG. 4 typically occurs immediately upon the mobile device 102 sensing that a connection has been established between the mobile device and the external display device 104, for example, when a physical plug of a wire forming the wired connection 6 is inserted into the terminal 108 of the mobile device 102 (or alternatively when the mobile device senses that a wireless connection such as a Bluetooth connection has been established between the mobile device and the external display device).

Particularly with respect to FIG. 3, when the mobile device 102 is operating in a normal mode in which the external display device 104 is not connected with (or being driven by) the mobile device 102, the software components executed by the processor portion 204 of the mobile device in particular include an Android operating system 302 and other software components 304 that interface the touchscreen display 112 (the touchscreen display 112 is shown in FIG. 3 for convenience, albeit it will be understood that the touchscreen display is not itself a software component but rather is a hardware component).

Although the Android operating system 302 is an operating system software component, it will be understood that the other software components 304 are programs/applications. Logically, therefore, the mobile device operating system 302 can be considered distinct from the other software components 304, and thus a dashed line 306 is provided in FIG. 3 showing this logical separation. Additionally, although the Android operating system 302 software component is referred to as an "operating system", it should be further understood that this software component can also be considered an Android "platform" insofar as this software component operates as a mobile or portable device platform that includes a lightweight version of the Linux operating system.

Further, although in the present embodiment it is the Android operating system (or platform) 302 that is operating on the mobile device 102, it should be understood that this is only one example mobile device operating system (or platform) that can be employed, and that in other embodiments one or more other operating systems (or platforms) can be utilized in addition to or instead of the Android operating system. For example, in other embodiments, instead of utilizing the Android operating system (or platform) 302 in the mobile device 102, rather another mobile device operating system (platform) can be employed including but not limited to the iPhone, Windows Mobile, Symbian, and other types of mobile device operating systems (platforms). While the Android operating system (platform) 302 and one or more of the other aforementioned mobile device operating systems (platforms) such as that of the iPhone utilize or are based upon forms of Linux, in some other embodiments the operating system (platform) need not utilize or be based upon Linux.

With respect to the other software components 304, these allow for the touchscreen display 112 of the mobile device 102 to operate to both output information/images as well as receive input commands via touching from a user (by way of a user finger, stylus or other actuation device). As shown, the other software components 304 include a graphics processing unit application programming interface (GPU API) 308 and a touchscreen driver 310, each of which is in communication with both the Android operating system 302 and the touchscreen display 112. More particularly, the touchscreen display 112 is driven by way of imaging signals 314 provided by the GPU API 308. The GPU API 308 provides the imaging signals 314 based upon imaging signals 316 received from the Android operating system 302. Although the imaging signals 314 can be identical to the imaging signals 316, more typically the imaging signals 314 differ from the imaging signals 316 insofar as the GPU API processes the imaging signals 316 to arrive at the imaging signals 314, which are more suited for the touchscreen display 112.

Although the imaging signals 314, 316 and GPU API 308 allow for the Android operating system 302 to drive and control outputting/imaging by the touchscreen display 112, additional signals are communicated allowing for the Android operating system 302 to receive information corresponding to user input signals (including user commands) received by the touchscreen display. More particularly as shown, the touchscreen display 112 upon receiving user input signals sends touchscreen signals 318 from the touchscreen display to the touchscreen driver 310. Additionally, the touchscreen driver 310 in turn processes the touchscreen signals 318 to arrive at touchscreen driver signals 320 that are then provided to the Android operating system 302 (across the dashed line 306). In the present embodiment, the touchscreen signals 318 are absolute coordinate signals indicative of locations on the touchscreen display 112 at which user input signals have been received (that is, the locations on the touchscreen display that have been touched). The touchscreen driver signals 320 further are absolute coordinate signals in the present embodiment (the touchscreen driver can be considered a Linux input device interface to the touchscreen hardware). Notwithstanding the description of the signals 318, 320 provided between the touchscreen display 112 and the touchscreen driver 310 and then on to the Android device operating system 302, in other embodiments these signals can take other forms.

Turning to FIG. 4, software component interactions within the mobile device 102 change considerably from that shown in FIG. 3 when the mobile device determines that an external display device such as the external display device 104 has been connected to the mobile device. When this occurs, the mobile device 102 switches its mode of operation from its normal mode to an external display mode, and the Android operating system 302 no longer directly communicates with the other software components 304 but rather a number of additional intermediary software components 402 begin operating. That is, when the external display device 104 is connected to the mobile device 102 (e.g., is plugged into, or otherwise enters into communication with the mobile device), the additional intermediary software components 402 are launched and executed by the processor portion 204 in addition to the other software components 304 and the Android operating system 302. Notwithstanding the above description, in some alternate embodiments other triggering events besides the connecting of the external display device 104 to the mobile device 102 can also precipitate the switching of operation between the configuration of FIG. 3 and the configuration of FIG. 4.

As described in further detail below, the additional intermediary software components 402 serve to interface between the Android operating system 302 and the other software components 304, as well as to allow for communications with the external display device 104 (or, more particularly, to allow for communications with the display 110 of the external display device). Similar to FIG. 3, although the touchscreen display 112 as well as the external display device 104 (and the display 110) are hardware components/devices, these components/devices are also shown in FIG. 4 for convenience, to illustrate the relative interactions among the various software components and these hardware components/devices. Also similar to FIG. 3, a logical distinction can be understood to exist between the Android operating system 302 and the additional intermediary software components 402 as represented by a dashed line 404, and further the additional intermediary software components can be distinguished from the other software components 304 (which are the same as in FIG. 3) as represented by a dashed line 406.

As shown, the other software components 304 include the same other software components as are shown in the FIG. 3, namely, the GPU API 308 and the touchscreen driver 310. Also as in FIG. 3, the GPU API 308 provides the imaging signals 314 to the touchscreen display 112 and the touchscreen display provides the touchscreen signals 318 to the touchscreen driver 312. However, in contrast to the arrangement shown in FIG. 3, in FIG. 4 the imaging signals 314 received from the GPU API 308 are based upon imaging signals 408 received by the GPU API from something other than the Android operating system 302, namely, from an event bridge component 412 that is one of the additional intermediary software components 402. Further, instead of the touchscreen driver 312 providing the touchscreen driver signals 320 to the Android operating system 302, in FIG. 4 the touchscreen driver signals 320 are provided to the event bridge component 412.

With respect to the additional intermediary software components 402, these include both the event bridge component 412 and several additional software components. More particularly as shown, in addition to the event bridge component 412, the additional intermediary software components 402 include an event forward driver component 414, an X windows component 416, an additional GPU API 418, an Android-in-a-window (AIW) component 420, and an EAS driver component 422, as well as possibly (thought not necessarily) one or more applications or Linux programs 424. The GPU APU 418 can be, but need not be, the same type of component as is the GPU API 308. As noted above, the additional intermediary software components 402 collectively serve as an interface or bridge between the Android operating system 302 and the other software components 304 and further serve to drive operation of the external display device 104 (and associated display 110). This is achieved by virtue of a number of interactive signals communicated among the intermediary software components 402 and between those additional intermediary software components and each of the Android operating system 302, the external display device 104 (and associated display 110), and the other software components 304.

More particularly in this regard, to begin, the event bridge component 412 is a Linux user space application that interfaces particularly with the other software components 304 and serves as a virtual input device. Among other things, the event bridge component 412 constitutes an executable component that captures input events coming from the touchscreen driver 312 in the form of the touchscreen driver signals 320 and also sends imaging signals (namely, the imaging signals 408) to the GPU API 308 for eventual transmission (typically following processing by the GPU API) to the touchscreen display 112 that are intended to cause the touchscreen display to show particular graphical images.

In the present embodiment, when the mobile device 102 is operating in the external display mode, the event bridge component 412 controls the touchscreen display 112 to display solely or primarily an image representative of a user interface (a virtual user interface) such as one or both of a trackpad (a selective input device allowing for user inputs in a manners similar to that achieved using a mouse-type device) and a keypad with images of keys. To the extent that a keypad is provided, the keys of the keypad can emulate ones of the keys/buttons 114, which are physical or "hard" keys, and/or be in addition to those hard keys so as to make possible other user inputs (e.g., user inputs to control a portrait/landscape orientation of the image shown on the touchscreen display 112). In short, the touchscreen display 112 is controlled to operate in one or both (simultaneously) of a keypad mode and a trackpad/mouse mode in which a pointer is particularly available.

Assuming that the touchscreen display 112 is primarily driven by the event bridge component 412 to serve as a user interface, the touchscreen signals 318 and touchscreen driver signals 320 particularly are key/location signals that are indicative of one or both of (i) whether location(s) on the touchscreen display 112 corresponding to displayed key image(s) have been touched or otherwise selected by a user, or (ii) whether particular location(s) on the trackpad shown on the touchscreen have been selected by a user. That is, the touchscreen signals 318 and touchscreen driver signals 320 particularly include one or both of key indication(s) that particular keys have been pressed/selected and/or coordinate indication(s) that one or more locations have been touched/selected. Where coordinate indication(s) are being provided, the touchscreen signals 318 and touchscreen driver signals 320 can particularly provide absolute coordinates values representative of absolute position(s) on the touchscreen display that have been selected/touched by a user.

Notwithstanding the above description, it should further be noted that, even though in the present embodiment the event bridge component 412 drives the touchscreen display 112 to solely or primarily show user interface features, there are some circumstances where the event bridge component 412 causes the touchscreen display 112 to display something other than (or in addition to) user interface features. In particular, this can occur when the event bridge component receives one or more incoming notifications 448. The incoming notifications can include, for example, override notifications sent by the Android operating system 302 that should still be displayed on the touchscreen display 112 of the mobile device 112 (e.g., in some circumstances, notification of an emergency incoming call, certain types of news, and possibly certain social networking/social status information, certain messages, and certain types of weather information or other real time information). Also, the touchscreen display 112 can be controlled to display a notification for a period of time at or subsequent to the time at which the external display device 104 is connected to the terminal 108 of the mobile device. Such a notification can be provided to the event bridge component 412 from the GPU API 418 upon its sensing of the presence of the external display device 104. Additionally, in at least some embodiments, the event bridge component 412 can also output outgoing notifications 450 to other system components.

Complementing the role of the event bridge component 412 in interfacing the other software components 304, others of the additional intermediary software components 402 serve to interface the Android operating system 302, namely, the AIW component 420 and the EAS driver component 424. As shown, in contrast to FIG. 3 where the Android operating system 302 sends the imaging signals 316 for receipt by the GPU API 308, in FIG. 4 the Android operating system instead sends out other imaging signals 426 for receipt by the AIW component 420. Further, rather than receiving the touchscreen driver signals 320 from the touchscreen driver 312 as in FIG. 3, in FIG. 4 the Android operating system 302 receives additional signals 428 from the EAS driver component 422, which provides those additional signals based upon AIW signals 430 received from the AIW component 420. The EAS driver component 422 in the present embodiment can be considered a Linux input device driver that is used to process the AIW signals 430 and to generate the additional signals 428 for the Android operating system 302 exclusively.

Further with respect to the additional intermediary software components 402, the X windows component 416 serves as a central mediating device in between the AIW component 420, the event bridge component 412, and several other software components. The X windows component 416 in the present embodiment particularly is provided by Linux and provides a windowing-type environment (logically similar to that provided by Microsoft Windows®) and includes a Windows Mobile (WM) application programming interface. While in the present embodiment, X Windows is employed, in other embodiments other windowing systems (again, for example, Microsoft Windows®) can be used.

As shown, the X windows component 416 is in communication with the event bridge component 412 via the event forward driver component 414, and by virtue of these communications the X windows component receives one or both of key indication information and/or coordinate indication information regarding user inputs provided to the touchscreen 112 as discussed above. More particularly in this regard, the event bridge component 412 upon receiving the touchscreen driver signals 320 is able to process and then forward related touchscreen input signals 432 to the event forward driver component 414. The processing performed by the event bridge component 412 can involve, for example, a conversion of absolute coordinate information into relative coordinate information.

The event forward driver component 414 upon receiving the related touchscreen input signals 432 in turn provides, based upon the related touchscreen input signals, forwarded touchscreen input signals 434 to the X windows component 416. The event forward driver can be considered basically a Linux-based X windows component that should be plugged in to allow the X windows component 416 to accept events from the event bridge component 412. By virtue of these communications, the X windows component 416 indirectly receives key and/or coordinate indication(s) of user inputs at the touchscreen display 112.

Upon the forwarded touchscreen input signals 438 being received at the X windows component 416, the X windows component is able to utilize the key/coordinate indication information itself, and additionally further sends that information on to the AIW component 420 as further touchscreen input signals 438. The further touchscreen input signals 438 upon being received by the AIW component 420 are used as the basis for the AIW signals 430 provided to the EAS driver component 422, which in turn are processed and provided to the Android operating system 302 as the additional signals 428. Thus, indirectly at least, the Android operating system 302 is provided with the same information or substantially the same information as is received by the Android operating system 302 in FIG. 3 when the touchscreen driver signals 320 are provided directly to the Android operating system from the touchscreen driver 310. That is, even when the mobile device 102 is operating in the external display mode, the Android operating system 302 is still apprised of user inputs at the touchscreen display 112.

As already noted, the Android operating system 302 sends the other imaging signals 426 to the AIW block 420. Given that the Android operating system 302 in FIG. 4 operates in the same or substantially the same manner as shown in FIG. 3 insofar as the Android operating system again receives touchscreen input information by way of the additional signals 428, in FIG. 4 the other imaging signals 426 can be understood to be the same or substantially the same type of imaging signals as the imaging signals 316 of FIG. 3. Nevertheless, as will be discussed in further detail below, when the mobile device 102 is operating in the external display mode, the other imaging signals 426 are not used to control the images displayed by the touchscreen display 112 (since it is rather the imaging signals 408 of the event bridge component 412 that are for this purpose) but rather impact what is displayed on the external display device. To format the other imaging signals for this purpose, therefore, those signals upon being received from the Android operating system 302 at the AIW component 420 in turn are processed by the AIW component to generate AIW imaging signals that are then provided to the X windows component 416.

In addition to the above interactions, as mentioned above the additional intermediary software components in the present embodiment further include the one or more applications or Linux programs 424 that are also operating on the mobile device 102. The applications or Linux programs 424 can, depending upon the embodiment or circumstance, take a variety of forms. For example, the applications or Linux programs 424 can include any of a variety of programs conventionally run on portable computers or other devices, including programs that require or utilize user inputs to govern operation of the program (e.g., a word processing program, a spreadsheet program, a video game, a desktop application, etc.). Further in the present embodiment, the operation of the applications or Linux programs 424 can further influence and/or be taken into account in what is displayed on the external display device 104 (or display 110). Also in the present embodiment, the applications or Linux programs 424 are designed to take into account, or operate based at least partly upon, user inputs as provided at the touchscreen display 112. Thus, when the mobile device 102 is operating in the external display mode, the further touchscreen input signals 438 are provided not only to the AIW component 420 but also to the applications or Linux programs 424 as shown.

Further, to allow for the applications or Linux programs 424 to influence the images displayed on the external display device 104 (or display 110), application imaging signals 442 are further provided from those applications/Linux programs to the X windows component 416. Although in the present embodiment the signals from the applications or Linux programs 424 are imaging signals, in other embodiments other signals that are not intended to specifically influence imaging can be sent instead of, or in addition to, the application imaging signals 442 to the X windows component 416. Further, notwithstanding the above description, in alternate embodiments no applications or Linux programs need be present or need operate at any given time, and/or no applications or Linux programs need take into account touchscreen user input information or provide application imaging signals to the X windows component 416.

Thus, as shown in FIG. 4, the X windows block 416 in the present embodiment receives several different types of incoming signals from several different sources, namely, the forwarded touchscreen signals 434, the AIW imaging signals 440, and potentially also the application imaging signals 442 from one or more of the applications or Linux programs 424. Based upon these signals, the X windows block 416 is able to determine an appropriate image (often made up of multiple image subportions) for display on the external display device 104 (or display 110). More particularly, based upon the forwarded touchscreen signals 434, the AIW imaging signals, and (at least in some embodiments or circumstances) the application imaging signals 442, the X windows block 416 generates output imaging signals 444 that are provided to the GPU API 418. The GPU API 418 in turn then generates further output imaging signals 446 that are output from the terminal 108 of the mobile device 102 and communicated, via the wired connection 106, to the external display device 104 (or display 110). The display 110 of the external display device 104 then displays images in accordance with those further output imaging signals 446.

Figure 5:
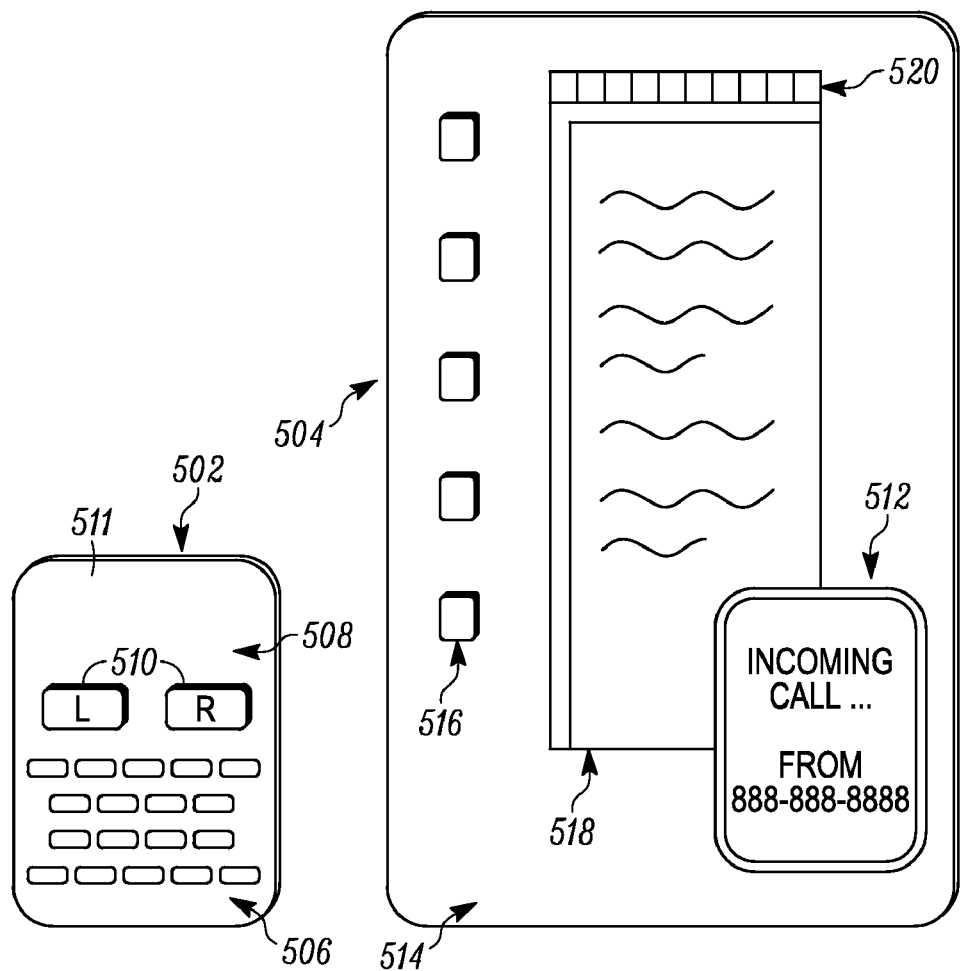
FIG. 5 are illustrations of example screen shots of a touchscreen display of the mobile device and an additional display of the external display device.

Given the software components 302, 304, 402 shown in FIG. 4, the mobile device 102 and external display device 104 are able operate in concert with one another in a manner that is considerably different from that of the normal mode (of FIG. 3). In particular, as discussed further below and additionally as illustrated in FIG. 5, while in the normal mode the touchscreen display 112 is used not only to receive certain types of user inputs but also to display mobile device operational status information (or other information) determined by imaging signals 316 provided by the Android operating system 302, in the external display mode it is the external display device 104 rather than the touchscreen display 112 that displays such operational status information provided by the Android operating system rather than the touchscreen displays 112, which instead is controlled to merely display one or both of the aforementioned trackpad and keypad. Further, in the external display mode, the external display device 104 not only is controlled to display the mobile device operational status information provided by the Android operating system 302, but also is controlled (or can be controlled) to display additional information such as that provided by the applications or Linux programs 424 by way of the application imaging signals 442.

More particularly, in the external display mode, the touchscreen display 112 becomes solely (or primarily) a user input device intended to receive user inputs and no longer serves (or no longer serves primarily) as a mechanism for communicating other types of information other than the displaying of the user interface and the operation thereof. The imaging signals 408, 314 communicated from the event bridge component 412 serve solely (or primarily) to control the generation of an image on the touchscreen display 112 corresponding to a user interface by which a user (or users) can input information. As discussed above, in the present embodiment, the user interface that is presented on the touchscreen display 112 is one or both of a trackpad and/or a keypad, although in other embodiments other types of user interfaces can also be presented (e.g., a menu driven user interface). In addition to causing the touchscreen display 112 to display a particular image, the imaging signals 408, 314 communicated from the event bridge component 412 further allow the touchscreen display 112 to vary in its appearance to reflect reactions of the user interface to user inputs (e.g., if a key of the keypad is pressed, then the image of that key is modified to show the pressing/response of that key).

Additionally, instead of utilizing the touchscreen display 112 to show mobile device operational status information (or other information) unrelated to the trackpad and/or keypad as provided by the Android operating system 302, in the external display mode such operational status information (or other information) is instead shown on the display 110 of the external display device 104. The Android operating system 302 continues to operate in the same or substantially the same manner as in the normal mode of FIG. 3, with the touchscreen input information (or information based thereon) being communicated indirectly to the Android operating system via the touchscreen driver 312, the event bridge component 412, the event forward driver component 414, the X windows component 416, the AIW component 420, and the EAS driver component 422. Further, in response to receiving the touchscreen input information at the Android operating system 302 (as well as even in the absence of such touchscreen input information), the Android operating system further provides to the AIW component 420 the other imaging signals 426 indicative of the mobile device operational status information (or other information).

Although the other imaging signals 426 can be used themselves to generate an image (just as the imaging signals 316 are used to generate an image in the normal mode corresponding to FIG. 3), in the external display mode of FIG. 4 the other imaging signals 426 are used to generate only a portion of the image ultimately displayed at the external display device 104. This is because, given the large size of the display 110 of the external display device 104 by comparison with the size of the touchscreen display 112, the external display device can display significant amounts of information above and beyond merely the operational status information (or other information) that would normally be displayed on the touchscreen display 112 in the normal mode.

To allow for the generation of an overall image on the display 110 of the external display device 104 that encompasses the Android operating system 302 imaging signal output but also includes other possible imaging information, and that synthesizes these different image components into the overall image, in the present embodiment the AIW component 420 modifies the other imaging signals 426 to generate the AIW imaging signals 440. In particular, the AIW imaging signals 440 allow for the generation of an image subportion (a "window") containing the same or substantially the same information as would be displayed as an overall image across an entire display screen if the other imaging signals 426 were themselves utilized to generate the image (as the imaging signals 316 are used to generate an image on the touchscreen display 112 in the normal mode of FIG. 3). In other words, the AIW component 420 grabs the screen of the Android operating system 102 and shows content of the Android screen for entry into the X windows component 416.

Assuming that the X windows component 416 is supplied with the AIW imaging signals 440 rather than the other imaging signals 426, the output imaging signals 444 generated by the X windows component (and thus the further output imaging signals 446 output by the GPU API 418 based thereon) are representative of a composite overall image that includes not only an image subportion corresponding to the imaging signals 426 from the Android operating system 302 but also one or more additional image subportions corresponding to other information/signals. Although the particular basis for the additional subportions can vary depending upon the embodiment, in the present embodiment the additional subportions particularly are reflective of the application image signals 442 provided from the applications or Linux programs 424. Thus, in the present embodiment the output imaging signals 444 generated by the X windows component 416, and thus the further output imaging signals 446 for driving the external display device 104, are particularly configured to cause the generation of a composite or synthesized image including both the mobile device operational status information corresponding to the AIW imaging signals 440 as well as image components corresponding to the status or operation of one or more of the applications or Linux programs 424 as indicated by the application imaging signals 442.

Turning now to FIG. 5, an example first image 502 that can be displayed on the touchscreen display 112 and an example second image 504 that can be simultaneously displayed on the display 110 of the external display device 104 are shown, to further illustrate operation of the overall mobile device 102 and external display device when the two devices are connected and the mobile device is operating in the external display device mode corresponding to FIG. 4. The first image 502 can also be considered a primary graphical user interface (GUI) while the second image 504 can be considered a second GUI. As shown, when such operation is occurring, the first image 502 provided on the touchscreen display 112 particularly includes a keypad 506 including multiple discrete keys, as well as a trackpad arrangement 508 that includes left and right selector buttons 510 and a region 511 in which touch inputs from a user can be received. As already discussed, thus, the first image 502 is configured to serve as an image of a user input device (or multiple user input devices) at which the user can enter user inputs.

Although the embodiment of FIG. 5 shows the image 502 as including both the keypad and trackpad features, these are only intended to be examples. For example, in other embodiments, only the trackpad or the keypad is present, or other types of user input interface features are present instead of or in addition to these features. Further, in at least some embodiments, the touchscreen display 112 imagery is controlled (e.g., by the event bridge component 412) so that the user interface features are reoriented (e.g., between landscape and portrait arrangements on the touchscreen display) depending upon various factors including various inputs provided via the sensors 228 of the mobile device. For example, the orientation of the mobile device 102 relative to ground or some other reference point, as sensed by one or more sensors 228, can serve as the basis for reorienting one or more features displayed on the touchscreen display 112.

While the touchscreen display 112 provides the first image 502, the display 110 of the external display device 104 displays other information in the embodiment of FIG. 5. More particularly as shown, the second image 504 provided on the display 110 includes a first subportion or window 512 showing an image based upon the AIW imaging signals 440 that, as discussed above, reflect the other imaging signals 426 provided by the Android operating system 302. The first subportion 512 is representative of what would be shown on the touchscreen display 112 of the mobile device 102 due to operation of the mobile device on its own if the external display device 104 was not present and the mobile device was operating in the normal mode of FIG. 3. Further for example, as shown, the first subportion 512 can show a message "incoming call . . . from 888-888-8888" indicating that the mobile device 102 is receiving a phone call from an outside phone number which such is occurring.

It will be understood that, notwithstanding the particular imagery shown in the first subportion 512 of FIG. 5, the particular information displayed by that subportion in any given circumstance or embodiment can vary depending upon the particular circumstances of operation being experienced by the mobile device 102 A variety of types of information can also be displayed. For example, the first subportion 512 can alternatively include a text area indicating a text message input from the user (as would be recognized by the Android operating system 302). Also for example, in some circumstances, the first subportion can display information regarding various types of social networking and/or social status information, various other forms of messages (e.g., email), and various types of information such as news, weather, stock market, or other real-time information. Also, the location of the first subportion 512 within the second image 504, the relative size of that subportion in comparison with the second image, and other characteristics can vary depending upon the embodiment.

In addition to the first subportion 512, there also exists a second subportion 514 that occupies the remainder of the second image 504 shown on the display 110 of the external display device 104. The second subportion 514 depending upon the embodiment or circumstance can include any of a variety of information, including any of a variety of information provided by or corresponding to the operation of one or more of the applications or Linux programs 424 that are being executed by (or potentially can be executed on) the mobile device 102. In the present example, the second subportion 514 in particular includes several icons 516 corresponding to selectable applications that can be run upon the mobile device 102 and also a window portion 518 showing an image associated with a particular application that is already operating, namely, a word processing document image complete with sub-icons 520 that the user can select to influence operation of the word processing application.

Although in the example of FIG. 5 both the first and second subportions 512, 514 are present, it will be understood that in some cases only the second subportion or the first subportion need be present at a particular moment. For example, in some cases, the first subportion 512 corresponding to the mobile device operational status (as indicated by the other imaging signals 426 of the Android operating system 302) can disappear since nothing of interest is going on with the mobile device at the moment. Alternatively, it is possible that the first subportion 512 can be expanded to occupy the entire (or almost the entire) display 110 of the external display device 104.

Figure 6:
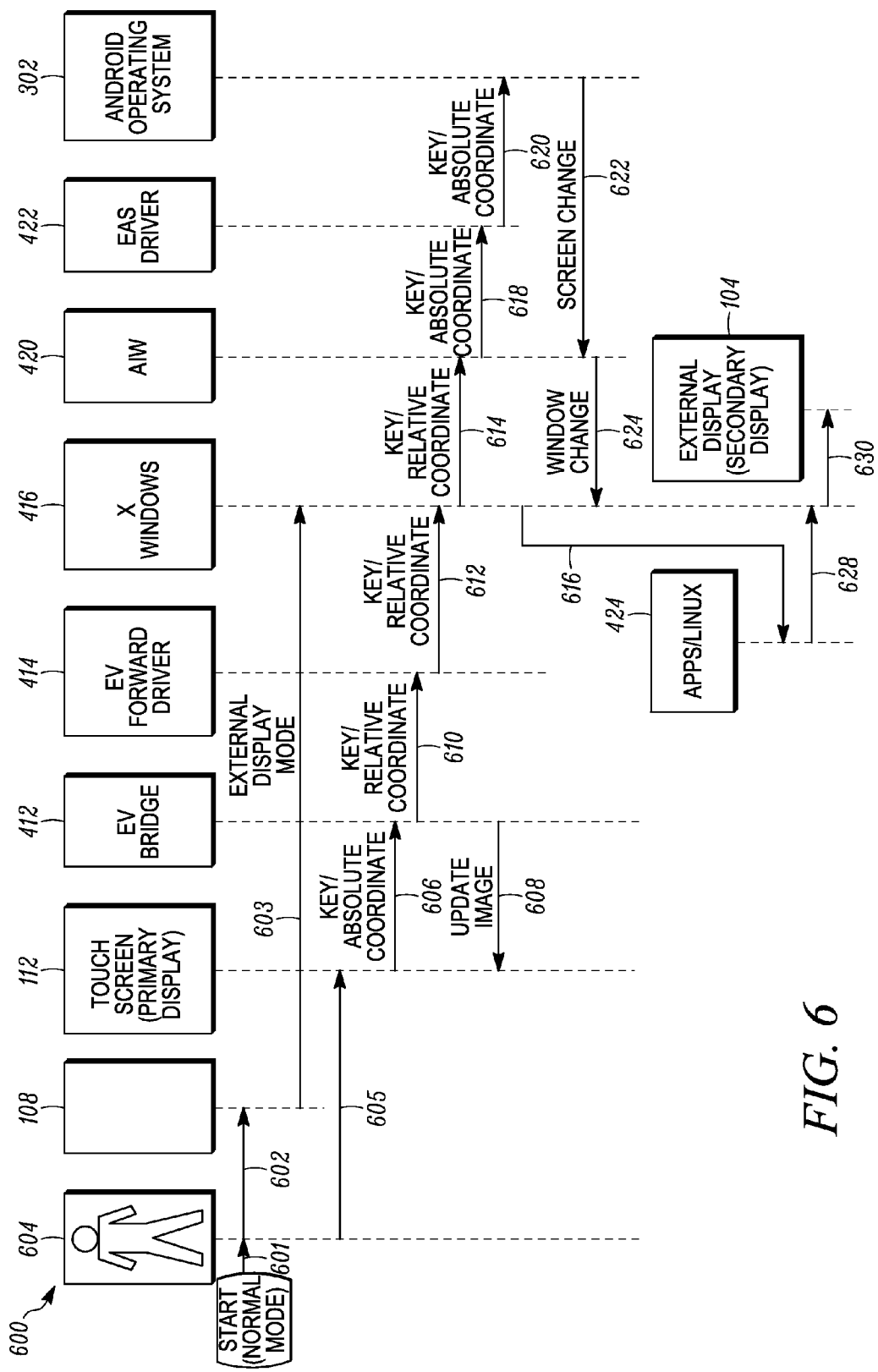
FIG. 6 is a sequence diagram/flow chart showing various example steps of operation of some of the components of the system/components of FIGS. 1-4.

Referring now to FIG. 6, an exemplary sequence diagram/flow chart 600 is additionally provided to show in further detail example signal flow when the mobile device 102 begins to operate, and then continues to operate, in the external display mode corresponding to FIGS. 4-5. In the present example, operation begins as represented by an arrow 601 indicating that the mobile device 102 is initially operating in the normal mode (where the external display device 104 is not yet connected to the mobile device). Next, as represented by an arrow 602, the external display device 104 is connected to the mobile device 102 (e.g., by a user 604 so as to establish the wired connection 106). Next, as represented by an arrow 603, the mobile device 102 detects (is notified) that the external display device 104 has been connected to the mobile device 102, and consequently the mobile device 102 launches all of the additional intermediary software components 402 so that those software components are being executed by the processor portion 204. This is represented by the arrow 603 in that it is point to the X windows component 416 of the additional intermediary software components 402 in particular. Thus, the mobile device 102 begins operating in the external display mode of operation and at least the first subportion 512 corresponding to the Android operating system 302 output information regarding mobile device operational status is displayed on the external display device 104 (the "Android window" is brought into "focus").

Next, the user 604 touches the touchscreen display 112 of the mobile device 102 as represented by an arrow 605. Upon the touchscreen display 112 being touched in this manner, the touchscreen display sends the touchscreen signals 318 including the touchscreen input information (particularly key and/or absolute coordinate value information) to the event bridge component 412. The communication of this touchscreen input information from the touchscreen display 112 to the event bridge component 412 is particularly represented by an arrow 606, with it being understood that (although not shown in FIG. 6) this information further passes through the touchscreen driver 310 on its way from the touchscreen display to the event bridge component. Next, upon the touchscreen input information being received at the event bridge component 412, the event bridge component determines whether the image displayed on the touchscreen display 112 itself should be updated to reflect the user's input action or for some other reason. For example, the image at the touchscreen display 112 potentially can be changed to show the depression of a key displayed on the touchscreen display or a movement of a cursor shown on the display. Thus, the imaging signals 408 and then 314 (by way of the GPU API 308) are provided back to the touchscreen display 112, as represented by an arrow 608 of FIG. 6.

In addition, upon the event bridge component 412 receiving the touchscreen input information, it also further provides the related touchscreen input signals 432 to the event forward driver component 414, and the event forward driver component in turn provides the forwarded touchscreen input signals 434 based thereon to the X windows component 416, as represented respectively by arrows 610 and 612 in FIG. 6. As noted, while any coordinate information included among the touchscreen input information received by the event bridge component 412 according to the arrow 606 is absolute coordinate value information, any coordinate information provided from the event bridge component 412 to the event forward driver component 414 and then to the X windows component 416 is relative coordinate value information.

As already discussed, the touchscreen input information received at the X windows component 416 as communicated indirectly from the touchscreen display 112 can be pertinent to operation of the mobile device 102 itself (as would be the case regardless of whether the external display device 104 was present) as well as pertinent to the operation of one or more of the applications or Linux programs 424 that are operating on the mobile device 102 and the display of which is particularly made possible by way of the external display 104 being present. Thus, upon the X windows component 416 receiving the touchscreen input (e.g., key or relative coordinate) information, the X windows component sends that information in the form of the further touchscreen input signals 438 both to the AIW component 420 as represented by an arrow 614 as well as to the applications or Linux programs 424 as indicated by an arrow 616. Upon receiving the touchscreen input (e.g., key or relative coordinate) information at the AIW component 420, that component in turn sends that information, in the form of the AIW signals 430, to the EAS driver component 422 as represented by a further arrow 618. As indicated, while any coordinate information included among the touchscreen input information received by the AIW component 420 according to the arrow 614 is relative coordinate value information, any coordinate information provided from the AIW component 420 to the EAS driver component 422 is absolute coordinate value information.

Upon receiving the AIW signals 430 containing the touchscreen input information, the EAS driver component 422 in turn forwards that information, in the form of the additional signals 428, to the Android operating system 302 as represented by an arrow 620. The Android operating system 302 upon receiving the touchscreen input information then determines how the mobile device operation (and particularly the display of information corresponding to mobile device operation) should change in view of that received information. Upon determining that a particular screen change should be made, the Android operating system 302 in turn sends the other imaging signals 426 to the AIW block 420 reflective of the appropriate screen change, as represented by an arrow 622. Since the other imaging signals 426 are configured to cause an entire screen change, and yet (as discussed above) in the external display mode only a subportion/window of the overall image displayed by the external display device 104 is to reflect the Android operating system 302 imaging information, the AIW component 420 serves to convert the received other imaging signals 426 into the AIW imaging signals 440. The AIW imaging signals 440, which are suitable for producing a window change corresponding to the Android operating system 302 imaging information, are then sent to the X windows component 416 as represented by an arrow 624 (more particularly in this regard, the AIW detects the changes in the Android presentation and displays the modified graphical image subportion(s)/area(s) by calling the WM API).

As already noted, the X windows component 416 serves to integrate the imaging information provided by the AIW imaging signals 440 (reflective of the window change), with additional imaging information provided by the applications or Linux programs 424. Thus, upon receiving the application imaging signals 442 from the applications or Linux programs 424 as indicated by an arrow 628, the X windows component generates the output imaging signals 444 based upon both the application imaging signals 442 and the AIW imaging signals 440 and then sends the output imaging signals for receipt by the external display device 104, as indicated by an arrow 630. It will be understood that sending of the output imaging signals corresponding to the arrow 630 is intended to be representative of the further processing of those imaging signals by the GPU API 418 and corresponding sending of the further output imaging signals 446 to the external display device.

In view of the above description, it should be evident that at least some of the disclosed embodiments and/or variations thereof provide one or more advantages. To begin, when the mobile device 102 is connected to the external display device 104 and operating in the external display mode, the user is provided with a large area, highly usable, built-in virtual keyboard and/or trackpad device (or other user interface). Thus, the user can operate the mobile device 102 and applications running thereon (such as the applications or Linux programs 424) without carrying other input devices, and can particularly achieve efficient entry of entering text and/or controlling a desktop environment in which multiple applications are running. The virtual keyboard and/or trackpad user interface provided can be a close analog of a real keyboard and/or trackpad (or mouse-type device), making the use of the mobile device touchscreen display 112 as a user input device intuitive.

Further, through efficient use of the external display device 104, not only is it possible to continue to display mobile device operational status information as provided by the Android operating system, but also it is possible to display a wide variety of other types of information, and particularly to display significantly greater amounts of information of different types that is possible when merely employing a mobile device alone. Among other things, the mobile device operational status information as provided by the Android operating system can be made always visible on the external display device. Further, the user can be provided with this information without displaying the information on the touchscreen display of the mobile device itself, that is, the information can be made available without limiting the efficacy of the touchscreen display as a user input device by taking up precious space on the touchscreen display for the display of such information. Additionally, multiple ones of the applications or Linux programs 424 (or other applications) can be run using the mobile device 102 as the platform forming the desktop environment. That is, at least some embodiments enable the use of full blown windowing systems and window based applications in mobile devices, which can allow leveraging of the phone to provide a desktop (windowing) environment on which on which one or more desktop applications can be utilized.

Additionally a variety of other benefits are achieved in at least some embodiments. For example, the mobile device platform and applications work as expected on the external display device without code modifications, as the screen resolution and size reported to them do not (or need not) change. Also, mobile device applications working concurrently can be displayed separately in different display surfaces, such as other windows or tabs. This makes it faster and easier to switch between applications and gives the user awareness of the applications running concurrently. Also, a user can respond to an incoming call by using the image portion of the image displayed on the external display device (that is, the window showing mobile device operational status as provided by the Android operating system, as displayed on the second GUI) to employ the mobile device as a hands free phone, or by disconnecting the external display device (e.g., HDTV) cable to engage in private conversations.

Further, notwithstanding the above description, the present invention is intended to encompass a variety of other embodiments in addition to those discussed above. For example, in some embodiments, given that in the external display mode the touchscreen display 112 is an active display, the trackpad area can be configured to give visual cues to the user (e.g., messages, photos, videos, etc.) as appropriate. Also for example, in some additional embodiments, the external display device can also serve as a touchscreen or otherwise allow for user inputs. In some such embodiments, user inputs such as gestures are particularly sensed in terms of how those gestures relate to the first subportion 512 of the overall image displayed on the external display device (that is, to the window corresponding to the output of the Android operating system). In such embodiments, there can be two way communications between the external display device and the mobile device 102.

Also for example, in some embodiments the touchscreen display 112 of the mobile device is configured to sense a variety of additional (e.g., non-standard) gestures, including for example multi-touch gestures. Further, in some embodiments in which the external display device is capable of receiving user inputs (in addition to the mobile device touchscreen display 112) but where the external display device is only capable of receiving certain types of user inputs but not others (again, for example, non-standard gestures), the mobile device 102 can operate to supercede the operation of the external display device in this regard if appropriate (for example, if the mobile device's window is in focus. For example, gestures made over the first subportion 512 (again, the window corresponding to the output of the Android operating system) phone are passed through to mobile device touchscreen display 112 (the primary GUI).

Thus, it is specifically intended that the present invention not be limited to the embodiments and illustrations contained herein, but include modified forms of those embodiments including portions of the embodiments and combinations of elements of different embodiments as come within the scope of the following claims.

The invention claimed is:

1. A mobile device comprising:
a first communication device having one or both of a first transmitter and a first receiver;
a user input device allowing the mobile device to receive user inputs;
a terminal by which the mobile device can be in communication with an external display device; and
at least one processor portion executing a plurality of software components including a mobile device operating system component and at least one intermediary software component by which the mobile device operating system communicates at least indirectly with both the user input device and the terminal,
wherein the plurality of software components operate so as to provide external display driving signals at the terminal that are configured to cause the external display device to display an image including a first image portion representative of an operational status or condition of the mobile device,
wherein the mobile device operating system receives one or more input signals indirectly via the at least one intermediary software component that are indicative of the user inputs received at the user input device, and
wherein the mobile device operating system in response generates one or more first imaging signals upon which the external display driving signals are at least partly based, whereby the first image portion at least partly depends upon the user inputs or a response of the mobile device operating system to the user inputs.

2. The mobile device of claim 1, wherein the user input device is a touchscreen display, and wherein the input signals are indicative of one or more locations on the touchscreen display at which the user inputs have been received.

3. The mobile device of claim 2, wherein the at least one intermediary software components includes at least one additional software component that generates one or more second imaging signals that at least indirectly influence an touchscreen image displayed on the touchscreen display.

4. The mobile device of claim 3,
wherein the at least one additional software component includes a bridge component, and wherein the one or more second imaging signals are provided from the event bridge component to a graphics processing unit application programming interface (GPU API) that in turn, based at least in part upon the one or more second imaging signals, provides one or more third imaging signals to the touchscreen display.

5. The mobile device of claim 4 wherein, based upon the one or more third imaging signals, the touchscreen display outputs a further image including one or both of a keypad image and a mouse-type user interface image, and
wherein the bridge component receives, from a touchscreen driver software component, location signals indicative of the user inputs, the location signals being more particularly indicative of locations on the touchscreen that have been touched and that correspond to one or more of at least one key of the keypad image or at least one position within a selectable region of the mouse-type user interface image.

6. The mobile device of claim 1, wherein the mobile device operating system generates one or more first imaging signals upon which the external display driving signals are at least partly based.

7. The mobile device of claim 6, wherein the at least one additional software component includes a further software component that processes the one or more first imaging signals to generate one or more second imaging signals upon which the external display driving signals are at least partly based, wherein the one or more second imaging signals are configured to cause the first image portion to be a subportion of the image.

8. The mobile device 7, wherein the at least one additional software component also includes one or more applications and further includes at least one synthesizing software component, wherein the one or more applications generate third imaging signals, wherein the second and third imaging signals are received by the at least one synthesizing software component.

9. The mobile device of claim 8,
wherein the at least one synthesizing software component generates output signals upon which external display driving signals are at least partly based, and
wherein due to operation of the at least one synthesizing software component, the external display driving signals are configured to cause the external display device to display an image including both the first image portion and a second image portion, and wherein the first image portion is derived at least in part from the second imaging signals and the second image portion is derived at least in part from the third imaging signals.

10. The mobile device of claim 9, wherein the external display driving signals are configured to cause the external display device to display both a first window portion that is the first image portion representative of the operational status or condition of the mobile device, and a second window portion that includes the second image portion indicative of a status or condition of at least one of the one or more applications.

11. The mobile device of claim 10, wherein the mobile device operating system is an Android operating system that is or is part of an Android platform, and the further software component is an Android-in-a-window software component, and wherein the at least one synthesizing software component includes an X windows software component.

12. The mobile device of claim 10, wherein the one or more applications include one or more of a word processing application, an Internet browser application, and a spreadsheet application.

13. The mobile device of claim 8, wherein one or more input signals are provided at least indirectly from the user input device via the at least one synthesizing software component to the one or more applications and to the mobile device operating system, and wherein the second and third imaging signals at least partly are dependent upon one or more reactions of the one or more applications and the mobile device operating system to the one or more input signals.

14. The mobile device of claim 8, wherein the at least one intermediary software component additionally includes, in addition to the at least one synthesizing software component, one or more of: a GPU API by which the at least one synthesizing software component is in communication with the terminal; at least one interface component including at least one first driver component allowing communications between the at least one synthesizing software component and the mobile device operating system; and at least one further interface component including at least one second driver component allowing further communications between the user input device and the at least one synthesizing software component.

15. A mobile device system comprising:
   a mobile device including:
      a touchscreen display;
      an operating system executed and at least one additional software component executed by at least one processing component, the at least one additional software component serving to communicate to the operating system, at least indirectly, one or more input signals from the touchscreen display,
      wherein the operating system in response to the one or more input signals, generates one or more first image signals and-the at least one additional software component generates output signals based upon the one or more first image signals communicated at least indirectly from the operating system; and
   an external display device in communication with the mobile device, wherein the external display device receives the output signals and based thereon displays an image having first and second image components, and wherein the first image component at least partly depends upon the one or more input signals from the touchscreen display or a response of the operating system to the input signals, and is substantially similar to another image that would have been displayed on the touchscreen display if the external display device was not in communication with the mobile device.

16. The mobile device system of claim 15, wherein the at least one additional software component includes an application component that generates one or more second image signals, and wherein the second image component of the image displayed by the external display device is based at least indirectly upon the one or more second image signals.

17. The mobile device system of claim 15, wherein the mobile device includes one of a cellular telephone, a personal digital assistant, and a smart phone, and wherein the external display includes one of a television, a high definition television (HDTV) display device, and a computer monitor.

18. A method of operating a mobile device in relation to an external display device, the method comprising:
   detecting that the external display device is available for communications with, or has entered into communications with, the mobile device;
   starting execution on at least one processing device of one or more additional intermediary software components, where the one or more additional intermediary software components interface with each of a mobile device operating system, a touchscreen display via one or more touchscreen display software components, and the external display device;
   receiving one or more user inputs at the touchscreen display of the mobile device;
   providing, at least indirectly, one or more input signals indicative of the user inputs to the mobile device operating system by way of the one or more additional intermediary software components;
   generating at the mobile device operating system one or more first image signals indicative of a first image portion representative of a mobile device status or operational condition;
   processing the one or more first image signals so as to produce second image signals also indicative of the first image portion; and
   sending output signals identical to or based at least partly upon the second image signals for receipt by the external display device, whereby the external display device displays an overall image including the first image portion.

* * * * *